(12) United States Patent
Wu et al.

(10) Patent No.: US 11,738,277 B2
(45) Date of Patent: *Aug. 29, 2023

(54) GAME TESTING SYSTEM

(71) Applicant: Snap Inc., Santa Monica, CA (US)

(72) Inventors: William Wu, Marina del Rey, CA (US); Dylan Shane Eirinberg, Venice, CA (US); Alexander R. Osborne, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/305,979

(22) Filed: Jul. 19, 2021

(65) Prior Publication Data

US 2021/0339152 A1 Nov. 4, 2021

Related U.S. Application Data

(63) Continuation of application No. 16/177,315, filed on Oct. 31, 2018, now Pat. No. 11,090,569.

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *A63F 13/87* | (2014.01) |
| *A63F 13/71* | (2014.01) |
| *G06F 21/31* | (2013.01) |

(52) U.S. Cl.
CPC .............. *A63F 13/87* (2014.09); *A63F 13/71* (2014.09); *G06F 21/31* (2013.01); *A63F 2300/572* (2013.01); *A63F 2300/6009* (2013.01)

(58) Field of Classification Search
CPC ............................ G07F 17/32; G07F 17/3211
USPC ................ 463/1, 20, 22, 25, 39, 40, 42
See application file for complete search history.

(56) References Cited

U.S. PATENT DOCUMENTS

| | | |
|---|---|---|
| 10,191,722 B1 | 1/2019 | Payzer et al. |
| 11,090,569 B1 | 8/2021 | Wu et al. |
| 2004/0224772 A1 | 11/2004 | Canessa et al. |
| 2008/0096176 A1 | 4/2008 | Rogers et al. |

(Continued)

OTHER PUBLICATIONS

"U.S. Appl. No. 16/177,315, Final Office Action dated Apr. 29, 2020", 8 pgs.

(Continued)

*Primary Examiner* — Adetokunbo O Torimiro
(74) *Attorney, Agent, or Firm* — Schwegman Lundberg & Woessner, P.A.

(57) ABSTRACT

Aspects of the present disclosure involve a system comprising a computer-readable storage medium storing at least one program and a method for providing, by one or more processors, a first user of a plurality of users with access to a gaming application testing platform, each of the plurality of users being associated with a common gaming application developer entity, the gaming application testing platform being associated with a messaging application. A request from the first user to create a gaming application is received with the gaming application testing platform. A request from the first user to authorize a second user of the plurality of users to access the gaming application is received with the gaming application testing platform. The gaming application, integrated with features of the messaging application, is presented to the second user with the gaming application testing platform.

20 Claims, 9 Drawing Sheets

(56) References Cited

U.S. PATENT DOCUMENTS

| | | |
|---|---|---|
| 2009/0253517 A1 | 10/2009 | Bererton |
| 2014/0298257 A1 | 10/2014 | Grandhi |
| 2016/0092035 A1 | 3/2016 | Crocker et al. |
| 2017/0083292 A1 | 3/2017 | Mclaughlan et al. |

OTHER PUBLICATIONS

"U.S. Appl. No. 16/177,315, Non Final Office Action dated Jun. 17, 2020", 9 pgs.

"U.S. Appl. No. 16/177,315, Non Final Office Action dated Nov. 18, 2020", 9 pgs.

"U.S. Appl. No. 16/177,315, Non Final Office Action dated Nov. 25, 2019", 8 pgs.

"U.S. Appl. No. 16/177,315, Notice of Allowance dated Apr. 19, 2021", 5 pgs.

"U.S. Appl. No. 16/177,315, PTO Response to Rule 312 Communication dated May 3, 2021", 2 pgs.

"U.S. Appl. No. 16/177,315, Response filed Feb. 8, 2021 to Non Final Office Action dated Nov. 18, 2020", 9 pgs.

"U.S. Appl. No. 16/177,315, Response filed Feb. 17, 2020 to Non Final Office Action dated Nov. 25, 2019", 9 pgs.

"U.S. Appl. No. 16/177,315, Response filed May 14, 2020 to Final Office Action dated Apr. 29, 2020", 8 pgs.

"U.S. Appl. No. 16/177,315, Response filed Aug. 25, 2020 to Non Final Office Action dated Jun. 17, 2020", 9 pgs.

Osborne, Alexander R., et al., "Games in Chat", U.S. Appl. No. 16/177,318, filed Oct. 31, 2018, 69 pgs.

Osborne, Alexander R., et al., "In-Game Status Bar", U.S. Appl. No. 16/177,332, filed Oct. 31, 2018, 72 pgs.

Osborne, Alexander R., et al., "Messaging and Gaming Applications Communication Platform", U.S. Appl. No. 16/177,335, filed Oct. 31, 2018, 59 pgs.

U.S. Appl. No. 16/177,315, filed Oct. 31, 2018, Game Testing System.

US 11,738,277 B2

GAME TESTING SYSTEM

PRIORITY APPLICATION

This application is a continuation of and claims priority to U.S. patent application Ser. No. 16/177,315, filed Oct. 31, 2018, the disclosure of which is incorporated herein in its entirety by reference.

TECHNICAL FIELD

The present disclosure relates generally to messaging systems and more particularly to messaging within gaming applications.

BACKGROUND

The popularity of users interacting with other users online continues to grow. There are many ways for users to interact online with other users. Users can communicate with their friends using messaging applications and can play with other users online in multiplayer video games. However, there remains a disconnect between the people the user communicates with using the messaging applications and the people the user plays with in the multiplayer video games. In particular, a user typically has to leave a certain video game the user is playing to communicate with the user's friends through the messaging application, and the user has to leave a conversation the user is having in the messaging application to play the video game.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
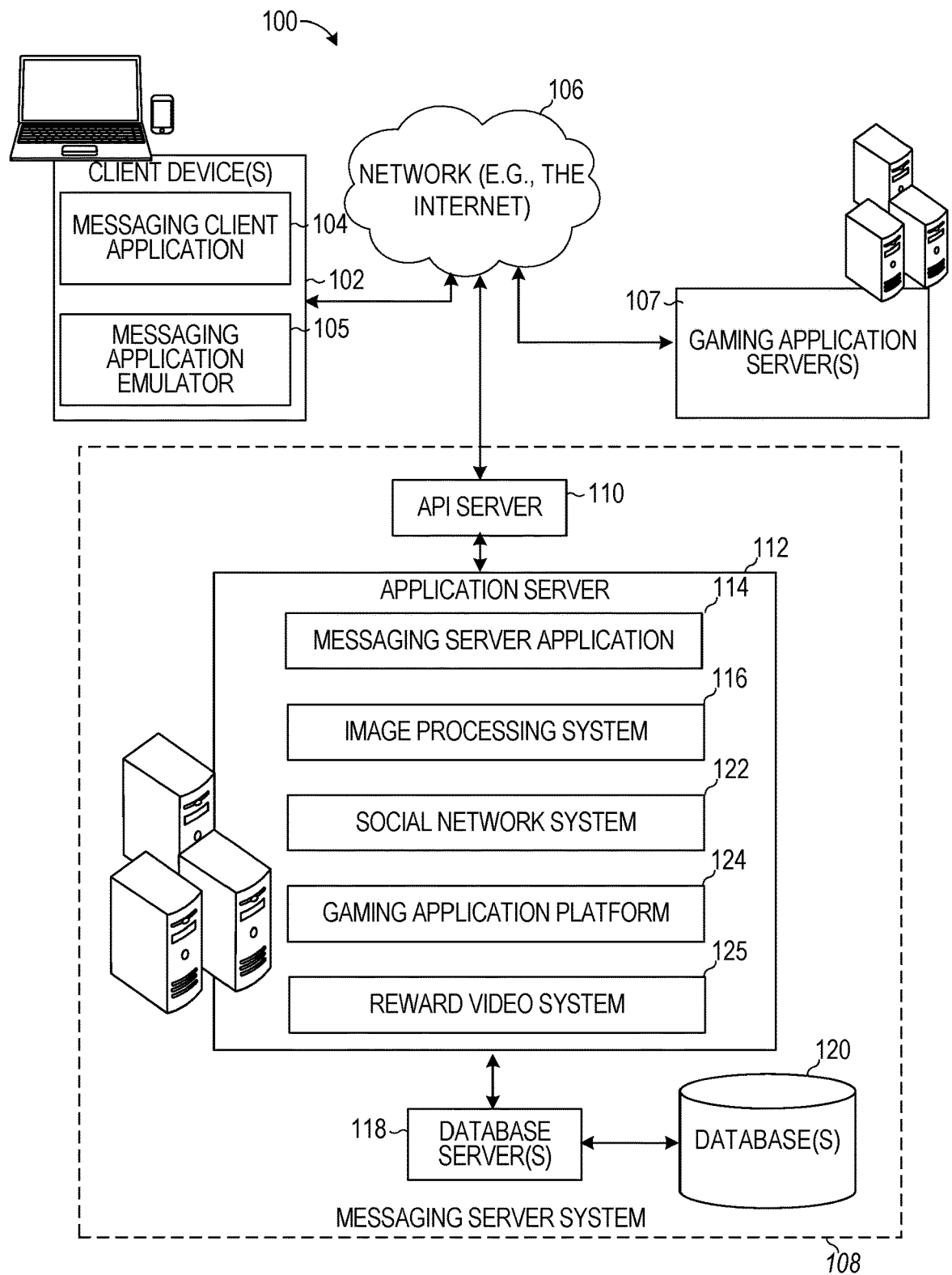
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Often, users utilize a messaging application to talk to their friends and a multiplayer video game to play with a known or an unknown group of users (a group that may not include their friends from the messaging application). This leaves the users with having to choose whether to talk to their friends on the messaging application or play with strangers in a video game application. In addition, while certain video game applications allow the user to chat with other users in the video game application, such chatting is limited to the users of the video game application (which may not include the user's friends on the messaging application) and has to be performed through the graphical user interface (GUI) of the video game application. The disclosed embodiments improve the functionality of gaming and messaging applications software and systems by providing game developers a platform they can use to test integration of a web-based gaming application with a messaging application.

Specifically, a game developer can create a web-based game to be integrated with the messaging application. Once a game and the messaging application are integrated, users of the messaging application can seamlessly transition from talking to their friends on the messaging application to continuing the conversation while playing the game with their friends. The disclosed embodiments provide a platform that allows the game developer to test integration of the game with a messaging application before making the game available to the public. Particularly, the disclosed embodiments provide, to the game developer, a messaging application emulator that provides a similar look and feel as the messaging application in which the gaming application will ultimately be integrated once made available to the public. Using the messaging application emulator and testing platform, the game developer can subject different builds and versions of the game to the same or similar conditions the game will experience once integrated into the messaging application. This allows the game developer to detect bugs, improve the stability and reliability of the game, and select the optimal build and version of the game to use during the game design phase and before integrating the game into the messaging application for all the users of the messaging application to access.

Conventional testing systems have many deficits relating to the efficient functioning of the computer, requiring a mobile phone game developer to use a mobile phone browser to test a game being developed and never exposing the game to the real conditions in which the game will be launched. This conventional process of game development could seem slow, complex, and difficult to manage, especially given the limited functionality available on a given mobile phone for testing the game. The disclosed embodiments improve the efficiency of using the electronic device by providing a game testing platform that allows a game developer to analyze game behavior using a web interface while running the game in a simulated environment of the messaging application on a mobile device. This significantly improves how a game developer tests and creates games and reduces the number of steps the game developer has to perform to create, debug, and launch a gaming application. This is because the game developer is provided with a platform that not only allows the game developer to launch the game in a simulated messaging application environment to see how the game behaves and operates, but the platform also provides metrics identifying how the game and various builds of the game operate in the simulated environment. Rather than iteratively launching a game in a mobile phone browser and using the limited interface of the phone browser to guess how the game would behave under different conditions and with different applications as done conventionally, only a few steps may be needed by the game developer to test the game behavior under simulated messaging application conditions.

Once the game has been tested using the gaming application testing platform, the game can be produced for integration with the messaging application to be made available to be played by all users of the messaging application. By integrating the ability to launch and join the gaming application from a conversation in a messaging application, participants to a conversation are able to quickly and easily see who is playing a given game and join those players. Because the game is launched from within a given conversation in the messaging application, the conversation participants can continue their conversation and play the game together. Namely, the conversation participants do not have to leave their conversation to play the game. This significantly improves the overall user experience.

FIG. 1 is a block diagram showing an example messaging system 100 for exchanging data (e.g., messages and associated content) over a network 106. The messaging system 100 includes multiple client devices 102, each of which hosts a number of applications including a messaging client application 104 and a messaging application emulator 105. Each messaging client application 104 is communicatively coupled to other instances of the messaging client application 104, messaging application emulator 105, and a messaging server system 108 via a network 106 (e.g., the Internet).

Accordingly, each messaging client application 104 and messaging application emulator 105 is able to communicate and exchange data with another messaging client application 104 and messaging application emulator 105 and with the messaging server system 108 via the network 106. The data exchanged between messaging client applications 104, messaging application emulators 105, and between a messaging client application 104 and the messaging server system 108, includes functions (e.g., commands to invoke functions) as well as payload data (e.g., text, audio, video, or other multimedia data).

Messaging application emulator 105 is an application that includes an abridged set of functions that are included in messaging client application 104. Messaging application emulator 105 is an application that a game developer can use to launch a given game in a simulated environment of the messaging client application 104. This enables the game developer to see how the game behaves and operates with a similar look and feel as the messaging client application 104 prior to releasing the game for integration into the messaging client application 104 for access by users of the messaging client application 104. Messaging application emulator 105 includes certain functions that enable a group of specified members of a game developer entity to access various builds and versions of a given game being developed by the game developer entity. The messaging application emulator 105 reports back in real-time statistics, metrics, and activities being performed by each member of the entity who is launching the game in the messaging application emulator 105 using a respective client device 102. Specifically, the messaging application emulator 105 can monitor, track, and store the average time per session (e.g., how long a given member of the game developer entity played the game in the simulated environment), the total number of sessions (e.g., how many times a given member of the game developer entity launched a new instance of the game or different builds of the game), the crash rate per platform (e.g., how often and how many times a given build of the game crashed or stopped functioning normally, having to be restarted), and the average loading time of the game (e.g., how long it takes the client device 102 to load a given build of the gaming application). The messaging application emulator 105 can report this information back to the gaming application platform 124 periodically or in real-time.

Once the game developer is satisfied with the way the game operates in the messaging application emulator 105, the game developer can select a given build or version of the game to send for production. Once in production and after being approved by the messaging server system 108, the game is integrated into the messaging client application 104 and can be launched by any user of the messaging client application 104 (e.g., the game can be played by users who are external to the game developer entity).

Each messaging client application 104 and messaging application emulator 105 is also able to communicate with one or more web-based gaming application server(s) 107. Each web-based gaming application server 107 hosts an HTML5 based game (or any other suitable web-based or markup-language-based game). Particularly, the messaging client application 104 or messaging application emulator 105 launches a web-based game by accessing the HTML5 file from the web-based gaming application server 107 associated with the game. In certain embodiments, the messaging application emulator 105 launches the web-based game by accessing a website associated with the gaming application testing platform which may be hosted by the web-based gaming application server 107 and/or the messaging server system 108. In certain embodiments, the games hosted by web-based gaming application server 107 and/or messaging server system 108 are programmed in JavaScript leveraging an SDK stored on gaming application platform 124 provided by the messaging server system 108. The SDK includes application programming interfaces (APIs) with functions that can be called or invoked by the web-based gaming application. In certain embodiments, the gaming application platform 124 includes a JavaScript library that provides a given gaming application access to certain user data of the messaging client application 104. HTML5 is used as an example technology for programming games according to some embodiments, but games programmed based on other technologies can be used.

In order to integrate the functions of the SDK into the game, the SDK is downloaded by the web-based gaming application server 107 from the messaging server system 108 or is otherwise received by the web-based gaming application server 107. Once downloaded or received, the SDK is included as part of the application code of the web-based game. The code of the web-based game can then call or invoke certain functions of the SDK to integrate features of the messaging client application 104 into the web-based gaming application. Some of the functions and functionality of the SDK which the web-based gaming application and the messaging client application 104 (or messaging application emulator 105) can call are discussed in detail in commonly-owned, commonly-assigned Alexander R. Osborne et al., U.S. patent application Ser. No. 16/177,335, filed Oct. 31, 2018, entitled "MESSAGING AND GAMING APPLICATIONS COMMUNICATION PLATFORM," which is hereby incorporated by reference.

For example, upon being launched either from the messaging client application 104 or the messaging application emulator 105, the gaming application can invoke an initialize function of the SDK (e.g., using the gaming application platform 124) to obtain various features of the messaging client application 104. Once invoked, the initialize function causes the messaging client application 104 (or messaging application emulator 105) to generate a response message for transmission to the gaming application platform 124. Specifically, the messaging client application 104 (or messaging application emulator 105) may include in the response message a conversation identifier, a gaming application identifier, one or more attributes of the conversation (e.g., conversation size, participants, font color of each participant's message text), user identifier information, display screen parameters (indicating regions of the display that can be occupied by the gaming user interface and regions of the display that will be occupied by the features of the messaging client application 104), a context (e.g., whether the game was launched from a discovery screen of the messaging client application 104, a conversation, an instant message, a non-conversation interface, etc.), and a geographical region. The web-based gaming application processes the message returned from the messaging client application 104 (or messaging application emulator 105) to determine the context from which the gaming application was launched.

As another example, the messaging client application 104 shares user data with the web-based gaming application based on the context from which the game was launched using the gaming application platform 124. Specifically, if the game was launched from a conversation, the messaging client application 104 includes attributes of the conversation in a response message for transmission to the gaming application. In response to receiving the conversation attributes, the gaming application presents data from the conversation (e.g., identifiers of conversation participants, font colors of the participant messages, etc.) together with the gaming interface to integrate the conversation into the game. Alternatively, if the game was launched from a discovery screen (or a non-conversation interface), only the user identifier may be provided and shared with the gaming application. In response to the game receiving a user request to invite another user to the game, the game invokes a play-with-friends function to cause the messaging client application 104 (or messaging application emulator 105) to present a list of the user's friends to the user (without actually sending the list of friends to the game). In the case of launching the game using the messaging application emulator 105, the list of friends includes those members of the game developer entity that have been authorized to access the game by an administrator of the game developer entity. Once the user selects the friends from the list whom the user would like to invite to the game, the identifiers of only the selected friends are transmitted from the messaging client application 104 (or messaging application emulator 105) to the gaming application to add the selected friends to the gaming interface and integrate the selected friends into the game via the platform.

As another example, the web-based gaming application is authorized to integrate features of the messaging application using the gaming application platform 124. At prespecified time intervals (e.g., every 90 seconds), the gaming application invokes the token authentication function to provide an authentication token. A message is sent to the messaging client application 104 (or messaging application emulator 105) through the gaming platform indicating that the token authentication function was invoked. In response, the messaging client application 104 (or messaging application emulator 105) determines whether the gaming application calling the function is allowed to communicate with the messaging client application 104. If the gaming application (or messaging application emulator 105) is allowed to communicate with the messaging client application 104, the messaging client application 104 provides a unique token in a response message via the platform to the gaming application. In certain embodiments, a gaming application (or messaging application emulator 105) is determined to be allowed to communicate with the messaging client application 104 if the gaming application was launched directly from the messaging client application 104. In this way, if the user tried to access the gaming application through a website associated with the gaming application without going through the messaging client application 104 (or messaging application emulator 105), the gaming application will be determined to not be allowed to communicate with the messaging client application 104 and will not be provided with the authentication token. Additional gaming data needed to run the gaming application will not be accessible to the game, which in turn restricts the gaming application to being allowed to be launched only directly through the messaging client application 104 (or messaging application emulator 105). The token provided in the message from the messaging client application 104 (or messaging application emulator 105) to the gaming application may only be valid for 90 seconds. If the gaming application communicates with an expired token with the messaging client application 104 (or messaging application emulator 105), the gaming application will not get a response from the messaging client application 104 or will be instructed by the messaging client application 104 (or messaging application emulator 105) that the token is expired. Further gaming data (e.g., gaming application data 207) will no longer be made available to the gaming application.

As another example, a social-based feature of the messaging client application 104 (or messaging application emulator 105) is prevented from being available to the web-based gaming application using the gaming application platform 124. For example, if the game was launched from a discovery screen (or a non-conversation interface), only the user identifier may be provided and shared with the gaming application. In response to the game receiving a user request to invite another user to the game, the game invokes a play-with-friends function to cause the messaging client application 104 (or messaging application emulator 105) to present a list of the user's friends to the user (without actually sending the list of friends to the game). Once the user selects those friends from the list whom the user would like to invite to the game, the identifiers of only those selected friends are transmitted from the messaging client application 104 (or messaging application emulator 105) to the gaming application to add those friends to the gaming application interface and integrate those friends into the game.

As another example, the user's avatar from the messaging client application 104 (or messaging application emulator 105) may only be made available to the gaming application in response to the gaming application invoking a fetch avatar image function. Specifically, the gaming application may determine a need to include a user's avatar next to score information presented in the gaming application. In this scenario, the gaming application, after being launched, invokes the fetch avatar image function, which passes a message to the messaging client application 104 (or messaging application emulator 105) with the user's identification information. The messaging client application 104 (or messaging application emulator 105) then generates a response message that includes an image representing the user's avatar obtained from the messaging client application 104 (or a link to the avatar image) and provides the response to the gaming application through the gaming application platform 124. The gaming application then integrates the user's avatar by displaying the avatar next to the score information in the game interface.

As another example, the gaming application platform 124 provides a reward video to the web-based gaming application and a leaderboard. The messaging client application 104 (or messaging application emulator 105) receives, via the platform 124, from the web-based gaming application a reward video request. For example, the gaming application may decide to give the user the opportunity to purchase or receive an upgrade at a reduced cost or for free if the user watches one or more advertisements. In response, the gaming application invokes a reward video related function to cause one or more advertisements to be presented to the user. The reward video system 125 selects a reward video. As an example, the gaming application invokes a get unconsumed reward video function. This function causes the messaging client application 104 (or messaging application emulator 105) to retrieve an advertisement video from the reward video system 125 that the reward video system 125 determines based on a user profile has not been delivered to the user. The messaging client application 104 (or messaging application emulator 105) provides the gaming application a unique identifier of each selected reward video. As another example, the gaming application invokes a retrieve reward video function that provides the unique identifier of the reward video. This function causes the messaging client application 104 (or messaging application emulator 105) to prepare a reward video advertisement corresponding to the unique identifier to be displayed later during gameplay. This ensures that when the user decides to view a reward video advertisement, the advertisement can be delivered to the user without delay. Specifically, in response to determining that the retrieve reward video function has been invoked by the gaming application, the messaging client application 104 (or messaging application emulator 105) communicates with the reward video system 125 to select and mark one or more video advertisements that match a user profile and that match the unique identifier provided by the gaming application. These selected and marked video advertisements are cached in a user's profile for a prespecified period of time until the gaming application informs the messaging client application 104 (or messaging application emulator 105) to present the cached video advertisements by way of invoking a watch reward video function. In some cases, the gaming application invokes a reward video ready function to determine whether the one or more video advertisements matching a unique identifier have been cached by the messaging client application 104 (or messaging application emulator 105) and are ready to present to the user. In some cases, the messaging client application 104 (or messaging application emulator 105) invokes a reward video ready function to inform the gaming application that the requested reward video advertisement is ready to be shown to the user. This function may include the unique identifier of the reward video that is ready to be presented.

The messaging client application 104 (or messaging application emulator 105) transmits, via the platform 124, to the web-based gaming application, an indication of consumption of the reward video. For example, once the messaging client application 104 (or messaging application emulator 105) starts presenting the reward video to the user in response to the watch reward video function being invoked, the messaging client application 104 informs the gaming application through the platform 124 that the reward video matching a unique identifier has started being consumed. The gaming application may invoke a consume reward video function to inform the messaging client application 104 (or messaging application emulator 105) that the reward video has been consumed. The messaging client application 104 (or messaging application emulator 105) may invoke a reward video complete function to inform the gaming application that the requested reward video advertisement matching the unique identifier has been completely consumed by the user. In some implementations, the gaming application, in response to receiving the message from this function that the reward video was consumed, makes available to the user the reward associated with the video (e.g., the selected game upgrade or update to the score).

As another example, a leaderboard managed by the messaging client application 104 (or messaging application emulator 105) is updated in response to receiving game score information from the web-based gaming application via platform 124. For example, the gaming application may invoke a submit score to leaderboard function. This function may include a leaderboard identifier and score information that are passed in a message to the messaging client application 104 (or messaging application emulator 105). Based on the leaderboard identifier and score information, the messaging client application 104 (or messaging application emulator 105) updates the corresponding leaderboard associated with the leaderboard identifier with the updated score information. In this way, the messaging client application 104 (or messaging application emulator 105) can maintain a leaderboard for a game without providing the game any sensitive information about who is in the leaderboard. Namely, the messaging client application 104 (or messaging application emulator 105), rather than the gaming application, maintains the leaderboard and has exclusive access to updating the leaderboard. The messaging client application 104 (or messaging application emulator 105) may determine leaders on the leaderboard on a geographical region basis or among a user's friends. The messaging application emulator 105 may maintain a leaderboard and determine leaders specific to a set of authorized members of the game developer entity. The leaderboard is presented by the messaging client application 104 (or messaging application emulator 105) to a user in response to receiving a leaderboard request from the web-based gaming application. For example, when the gaming application determines a need to present a leaderboard to a user (e.g., at the end of a stage or match or in response to receiving a user selection of a leaderboard button), the gaming application invokes a leaderboard function. The leaderboard function passes a message to the messaging client application 104 (or messaging application emulator 105) that identifies the leaderboard and causes the messaging client application 104 (or messaging application emulator 105) to present the leaderboard corresponding to the leaderboard identifier to the user. In this way, the leaderboard can be presented to the user without providing information to the gaming application about the status of various users on the leaderboard.

As another example, the gaming application platform 124 allows the messaging client application 104 (or messaging application emulator 105) to communicate volume settings, focus information, and loading information between the messaging client application 104 and the web-based gaming application. The messaging client application 104 (or messaging application emulator 105) transmits, via the gaming application platform 124, to the gaming application, a volume level of the web-based gaming application. For example, a user during gameplay in the gaming application may decide to conduct a voice party with the user's friends that are in the conversation playing the game. The voice party may allow each of the users to talk via a microphone and hear each other through the speakers during gameplay to avoid the need to type messages during gameplay. In response to the messaging client application 104 (or messaging application emulator 105) detecting activation of the voice party feature of the messaging client application 104 (or messaging application emulator 105), the messaging client application 104 (or messaging application emulator 105) may invoke the function to set a volume of the web-based gaming application. Specifically, this function may pass a message to the gaming application from the messaging client application 104 (or messaging application emulator 105) setting a volume of the web-based gaming application relative to the volume of the voices output by the speakers. In some implementations, the gaming application does not receive information from the messaging client application 104 (or messaging application emulator 105) about the level of the volume of the voice party line or any of the communications on the voice party line. All of the user's voice information is exchanged solely through the messaging client application 104 (or messaging application emulator 105) and the voice information and processing is handled by the messaging client application 104. The messaging client application 104 (or messaging application emulator 105) simply informs the gaming application to set the volume to a particular level that the messaging client application 104 selects based on the volume set for the voice party line. In some other implementations, the volume of the voice party line is communicated to the gaming application with an instruction indicating how much to set the gaming application volume relative to the voice party line volume.

At least one of an indication of a user's focus or display screen parameters are transmitted, via the platform, from the messaging application (or messaging application emulator 105) to the web-based gaming application. For example, the messaging application (or messaging application emulator 105) invokes a did lose focus function to inform the gaming application that the user has lost focus from the game and why. This informs the game that certain game elements cannot be selected on the screen because the user's focus has shifted to a different application or a different feature of the messaging application (or messaging application emulator 105). The feature may block the portion of the screen displaying the web-based gaming application, preventing the user from interacting with the game. In response, the gaming application pauses or terminates gameplay. The messaging application (or messaging application emulator 105) may invoke a did gain focus function to inform the game that the user has re-gained focus for the game. This means that the user has stopped focusing on the application or feature that was obstructing view of the game and can now again interact with the game. In response, the gaming application may resume gameplay.

The SDK stored on gaming application platform 124 effectively provides the bridge between the web-based gaming application and the messaging client application 104 (or messaging application emulator 105). This provides the user with a seamless experience of communicating with their friends on the messaging client application 104, preserving the look and feel of the messaging client application 104 while playing or testing a web-based gaming application. To bridge the web-based gaming application and the messaging client application 104, in certain embodiments, the SDK facilitates communication between the web-based gaming application server 107 and the messaging client application 104 (or messaging application emulator 105). In certain embodiments, a WebViewJavaScriptBridge running on a client device 102 establishes two one-way communication channels between the web-based gaming application and the messaging client application 104 (or messaging application emulator 105). Messages are sent between the web-based gaming application and the messaging client application 104 (or messaging application emulator 105) via these communication channels asynchronously. Each SDK function invocation is sent as a message and callback for each SDK function is implemented by constructing a unique callback identifier and sending a message with that callback identifier.

By utilizing the SDK, not all of the information from the messaging client application 104 (or messaging application emulator 105) is shared with the web-based gaming application server 107. The SDK limits which information is shared based on the needs of the web-based gaming application and based on a context from which the web-based gaming application was launched by the messaging client application 104. Also, by using the SDK, the gaming application is provided with information as to the state from which the gaming application was launched from the messaging client application 104 (or messaging application emulator 105). Based on this state information, functionality of a communication interface provided by the gaming application can be modified.

In certain embodiments, each web-based gaming application server 107 provides the HTML5 file corresponding to the web-based gaming application to the messaging server system 108. The messaging server system 108 can add a visual representation of the game in the messaging client application 104. The visual representation can be a box art of the gaming application or just text with the title of the gaming application. The box art (or cover art) includes an artwork as an illustration or photograph that visually identifies, describes, and/or promotes the gaming application. The box art is artistically connected to the gaming application and is created with art by the creator of the gaming application. Once the user selects the visual representation or instructs the messaging client application 104 (or messaging application emulator 105) through a GUI of the messaging client application 104 (or messaging application emulator 105) to launch the game, the messaging client application 104 (or messaging application emulator 105) obtains the HTML5 file and instantiates and initiates all the resources necessary to launch the game. When testing a given gaming application, once the user selects the visual representation or instructs the messaging application emulator 105 through a GUI of the messaging application emulator 105 to launch the game, messaging application emulator 105 presents a set of builds associated with the gaming application. In response to receiving a user selection of one of the builds, the messaging application emulator 105 obtains the HTML5 file associated with the selected build and instantiates and initiates all the resources necessary to launch the build of the game. In some cases, the messaging client application 104 accesses the corresponding web-based gaming application server 107 to launch the game.

In certain embodiments, gaming application platform 124 provides a gaming application testing platform. Particularly, gaming application platform 124 hosts a gaming application testing website and communicates with the messaging application emulator 105. The gaming application testing website provides various functions for a given gaming application developer (e.g., an administrator of the gaming application developer entity) to test how a given game being developed will look and feel when integrated into the messaging client application 104 and becomes accessible to all users of the messaging client application 104. One way in which the gaming application testing platform allows the developer to test how the game will look and feel is by enabling authorized users of the game developer to launch one or more builds of the game using the messaging application emulator 105. The messaging application emulator 105 provides limited access to features of the messaging client application 104 and allows only the members of the game developer entity to launch and to see how the game looks with the same look and feel as the messaging client application 104 without launching the game in the messaging client application 104. Because the messaging application emulator 105 has the functions of the messaging client application 104, the game, launched using emulator 105, is exposed to the same or similar conditions as when the game would be launched by messaging client application 104. This allows the game developer to improve the functionality and stability of the game before the game is made available to users of the messaging client application 104. One such function includes the ability to manage which members of the gaming application developer entity are authorized to access various builds of the gaming application using the messaging application emulator 105 and access rights associated with such members. Another function provided by the gaming application testing platform to a game developer includes the ability to manage and submit various gaming applications, see metrics of the game applications and various builds of the games, and control the publication process of the gaming applications and their respective builds. Further details of the operations performed by the gaming application platform 124 in providing the gaming application testing platform are discussed in connection with FIGS. 4-7.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the web-based gaming application server 107 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to reward videos stored on reward video system 125; access to user conversation data; access to avatar information stored on messaging server system 108; access to authentication tokens; access to a leaderboard; access to game score information; and opening an application event (e.g., relating to the messaging client application 104).

The application server 112 hosts a number of applications and subsystems, including a messaging server application 114, an image processing system 116, a social network system 122, gaming application platform 124, and reward video system 125. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends.

The reward video system 125 stores multiple advertisements. These advertisements may include a collection of video clips (e.g., 30-40 second video clips). A given web-based gaming application can use the advertisements stored on reward video system 125 to provide a reward to a user in the web-based gaming application. For example, a user can be provided with the option to watch a given advertisement in the video game to advance a level, to upgrade armor or weapons, to increase a score, or to purchase game content. The reward video system 125 can include a collection of profiles for each user of the messaging server system 108. Based on the profiles, the reward video system 125 can select advertisements suitable for or that may interest a given user. The reward video system 125 may also keep track of which advertisements each user of the messaging server system 108 has watched to avoid presenting the same advertisements multiple times to the same user. Leveraging the reward video system 125 managed by the messaging server system 108 avoids the web-based gaming application server 107 having to obtain and manage its own advertisements.

The application server 112 is communicatively coupled to a database server 118, which facilitates access to a database 120 in which is stored data associated with messages processed by the messaging server application 114.

Figure 2:
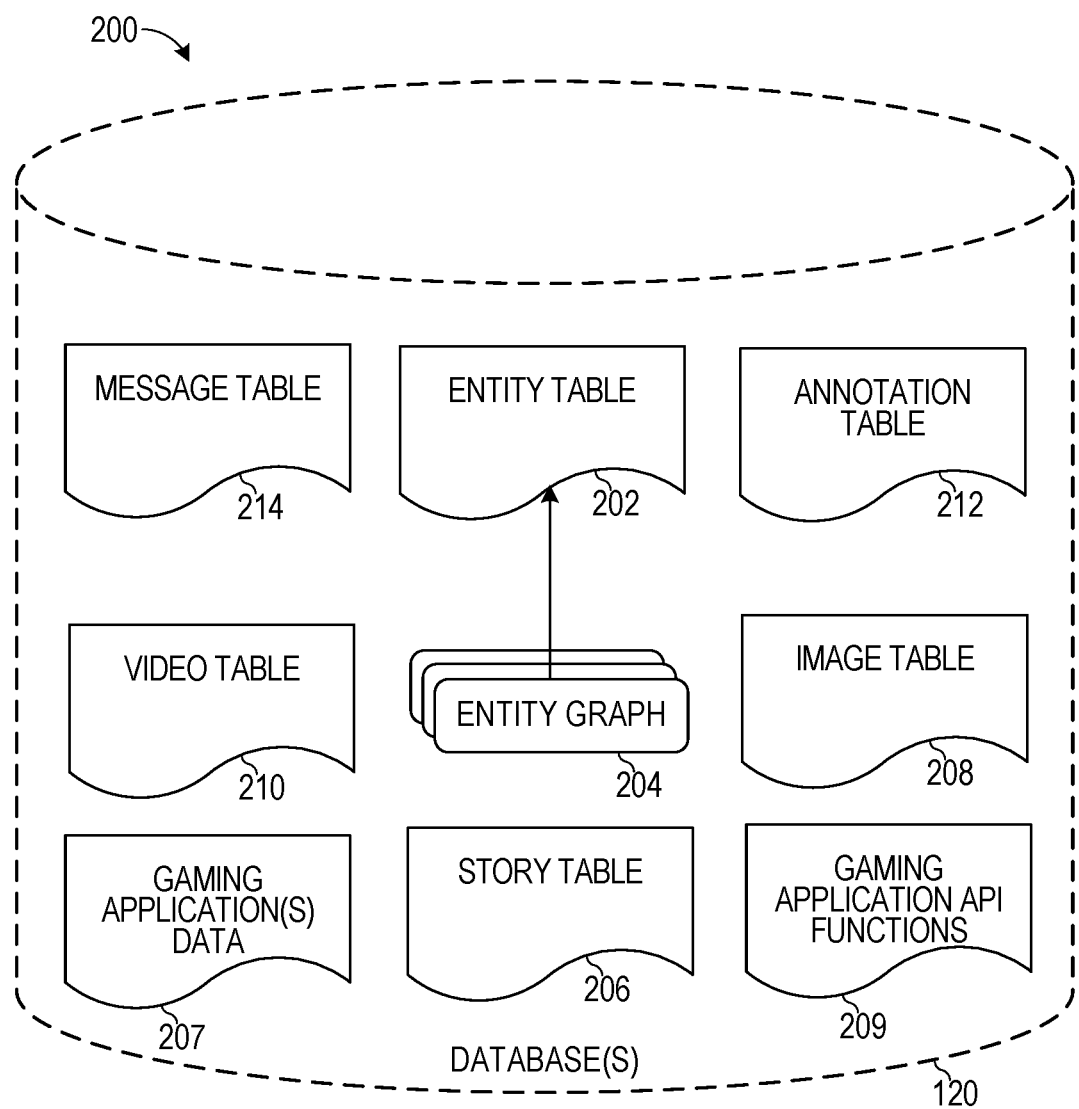
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s). Information from message table 214 may be provided in limited form and on a limited basis to a given web-based gaming application based on functions of the messaging client application 104 invoked by the web-based gaming application.

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Gaming application(s) data 207 stores gaming information associated with one or more web-based gaming application. Such gaming information may include any data or content provided by a game developer to the gaming application testing platform implemented by gaming application platform 124. For example, gaming information includes one or more builds or versions associated with a given game submitted by a game developer via the gaming application testing platform 124 and various game data (e.g., game title, game description, game box art). Such gaming information may include various metrics associated with the game and/or builds associated with each game. Such gaming information may include a list of authorized members of the game developer entity and their respective level of access for access to builds of the game through respective messaging application emulators 105 on respective devices 102. Such gaming information may include the publication status of various builds of the game (e.g., whether the game or build is in a staging or production state).

Gaming application(s) data 207 stores game data for games that are being tested using messaging application emulator 105 and games that have already been launched and integrated into the messaging client application 104. For example, such gaming information may include a visual representation (e.g., box art) or icon of the given web-based game. Such a visual representation is used by the messaging client application 104 to identify the game and allow the user to select the visual representation to launch the game. The gaming information may include information identifying the maximum number of players a given game can host. This information is used by the messaging client application 104 or emulator 105 to determine whether a game launched from a given conversation having a certain number of participants can support all of the participants of the conversation. The gaming information may include score information for each game. Such score information can be used by the messaging client application 104 or emulator 105 to manage and maintain a leaderboard that is specific to each game and/or that is geographically relevant and/or that is relevant to a given game developer entity. Namely, the leaderboard can represent leaders of the web-based game among a group of users in a particular geographical location or across the entire list of users of the messaging client application 104 or emulator 105. A leader represents a user with a higher score than another user though other attributes can be used to define a leader (e.g., a user who plays a game more time than another user). The gaming information may include a current volume level setting of the gaming application. This may be used by the messaging client application 104 or emulator 105 to set the volume of the audio of a voice conversation relative to the gaming application volume (e.g., to set the audio of the conversation to be 50% greater than the gaming application volume or set the gaming application volume to 50% less than the volume of the conversation audio).

Gaming application API functions 209 stores a number of functions of the SDK stored on gaming application platform 124. The gaming application API functions 209 stores the code that is executed when a given function of the API is invoked by the web-based gaming application, or the messaging client application 104, or messaging application emulator 105. As discussed herein, any function a game performs when launched by a messaging client application 104 can be similarly tested by being performed on messaging application emulator 105. Accordingly, a function described above and below as being performed by a messaging application (e.g., messaging client application 104) can be similarly performed by the messaging application emulator 105 for a set of authorized members of a game developer entity. For example, such API functions can include:

A function to initialize the web-based gaming application.

A function to set a volume of the web-based gaming application.

A function to provide an authentication token to the web-based gaming application.

A loading progress function, which indicates to the messaging application the loading progress of the web-based game.

A loading complete function, which indicates to the messaging application that loading of the web-based game has completed.

A fetch avatar image function, which is used by the web-based gaming application to obtain an avatar matching a given user(s)' identification.

A play with friends function to allow a user to select friends of the user on the messaging application to play with using the look and feel of the messaging application.

Reward-video-related functions to retrieve advertisements from reward video system 125 and track whether the user completed watching the given advertisements.

A leaderboard function to allow the web-based game to retrieve the leaderboard from gaming application data 207 to present to the user.

A submit score to leaderboard function to allow the web-based game to send to the messaging client application 104 score information for a given user to be updated in the leaderboard stored in the gaming application data 207.

An add/remove user function to allow the messaging client application 104 to add or remove users from the web-based gaming application.

A focus function to allow the messaging client application 104 to inform the web-based gaming application whether the user has lost/regained focus in the game so that the game knows the user is or is not active in the game and whether the user can or cannot interact with the game directly.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story. The UI of the messaging client application 104 may include selectable options to enable a sending user to add a modified video clip that has a virtual object to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
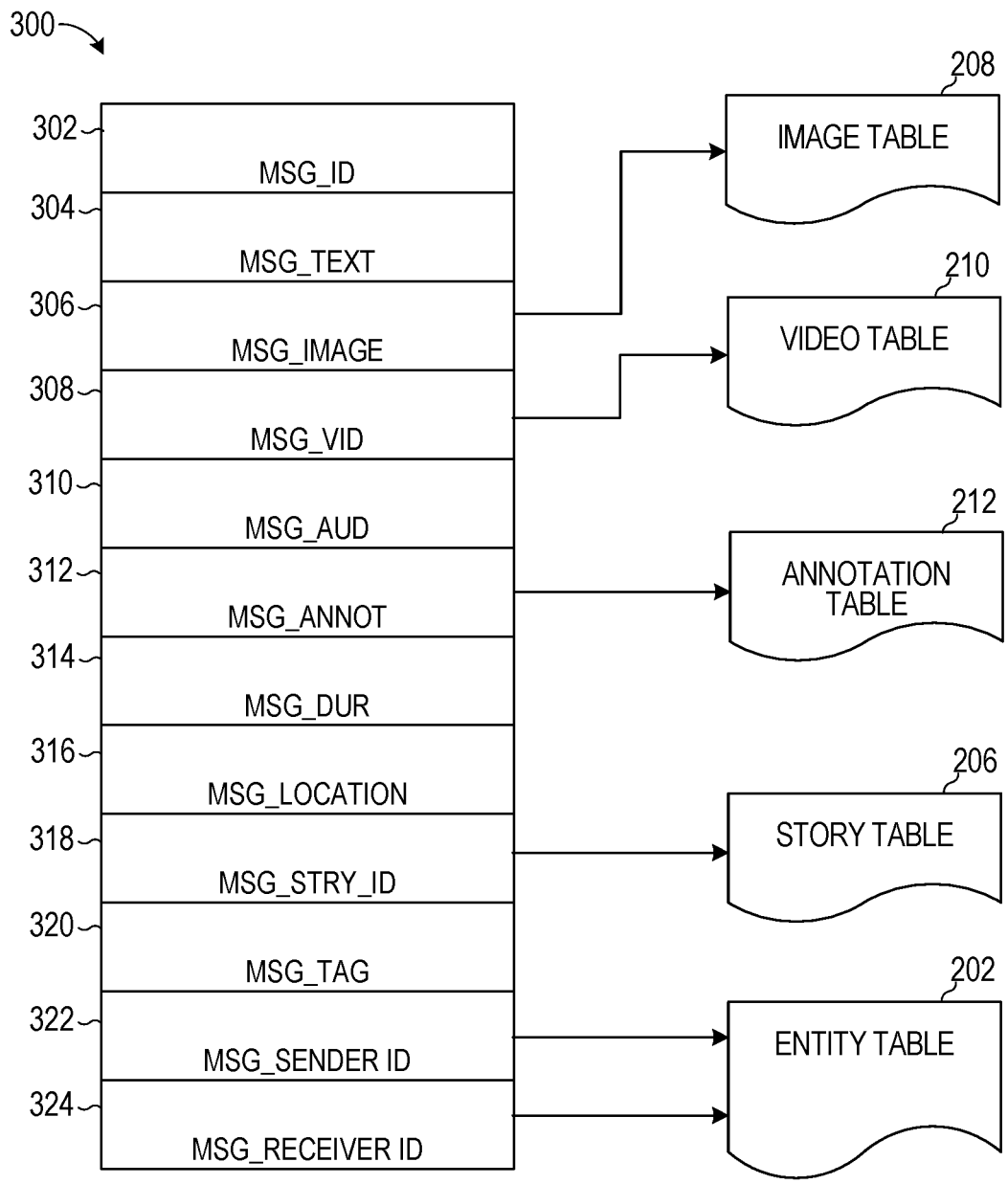
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

A message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
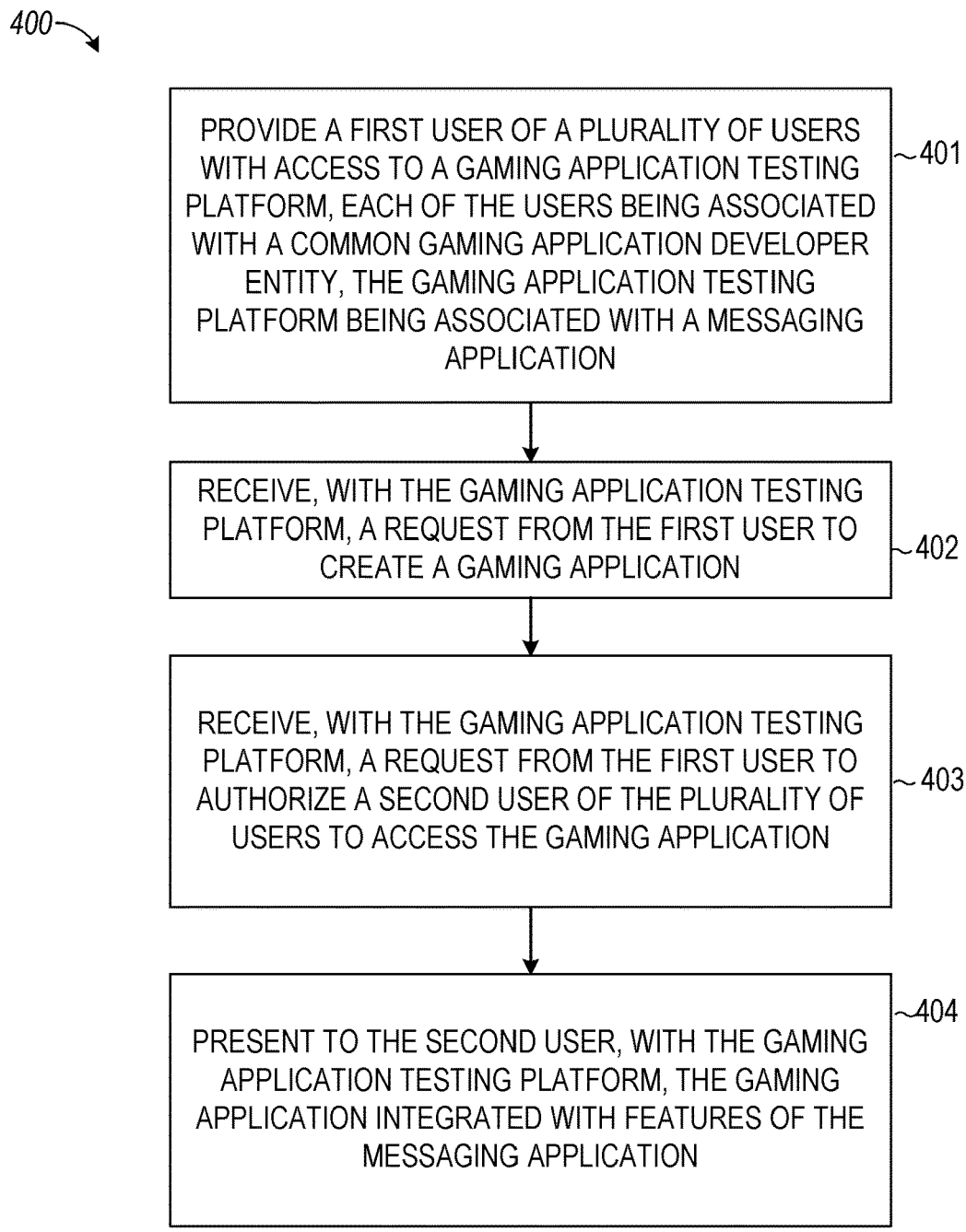
FIGS. 4-5 are flowcharts illustrating example operations of a gaming application testing platform, according to example embodiments.
Figure 5:
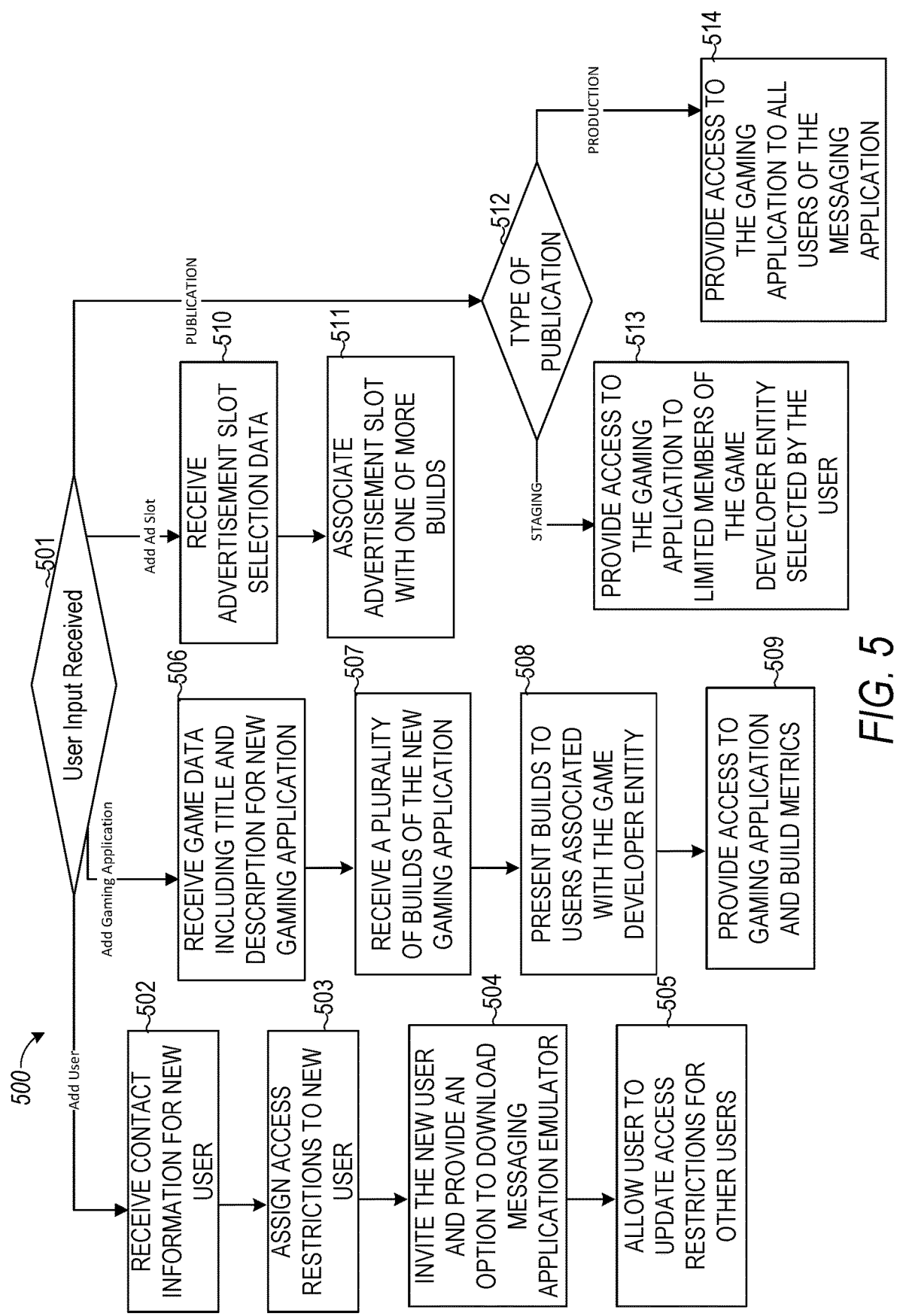

FIGS. 4-5 are flowcharts illustrating example operations of the gaming application testing platform in performing processes 400-500, according to example embodiments. The processes 400-500 may be embodied in computer-readable instructions for execution by one or more processors such that the operations of the processes 400-500 may be performed in part or in whole by the functional components of the messaging server system 108; accordingly, the processes 400-500 are described below by way of example with reference thereto. However, in other embodiments at least some of the operations of the processes 400-500 may be deployed on various other hardware configurations. The processes 400-500 are therefore not intended to be limited to the messaging server system 108 and can be implemented in whole, or in part, by any other component.

At operation 401, the gaming application platform 124 provides a first user of a plurality of users with access to a gaming application testing platform. Each of the users is associated with a common gaming application developer entity and the gaming application testing platform is associated with a messaging application (e.g., messaging client application 104). For example, a given gaming application developer entity (e.g., an organization of users that creates one or more gaming applications) may be interested in creating a game to be integrated into the messaging application. As part of creating the game, the gaming application developer entity may need to test various features and functions of the game to ensure the game operates without errors or minimal crashes when integrated into the messaging application. In order to start testing the features and functions of the game, the gaming application developer entity may use the gaming application testing platform of the gaming application platform 124.

Initially, the gaming application developer entity may create an account with the gaming application platform 124 that identifies the gaming application developer entity. For example, a public website associated with the gaming application testing platform may include a new account registration section. In this new account section, a member of the gaming application developer entity may provide various business-related information associated with the gaming application developer entity. For example, the member may provide the business name, email address, and display name of the gaming application developer entity. This information may be stored and associated with the account created for the gaming application developer entity. The member may also identify one or more members of the gaming application developer entity who will be the administrators within the gaming application testing platform.

The gaming application testing platform may send a notification to the one or more members of the gaming application developer entity informing them to register with the gaming application testing platform as administrators. To register, the members may access the gaming application testing platform website and create a member account which is associated with the gaming application developer entity account on the gaming application testing platform. In some embodiments, the member designated by the gaming application developer entity as the administrator may already have an account with the messaging application of the gaming application testing platform. In such circumstances, in response to receiving the notification, the member may access the website of the gaming application testing platform and log in using the same credentials as those used by the member to log into the messaging application.

Figure 6:
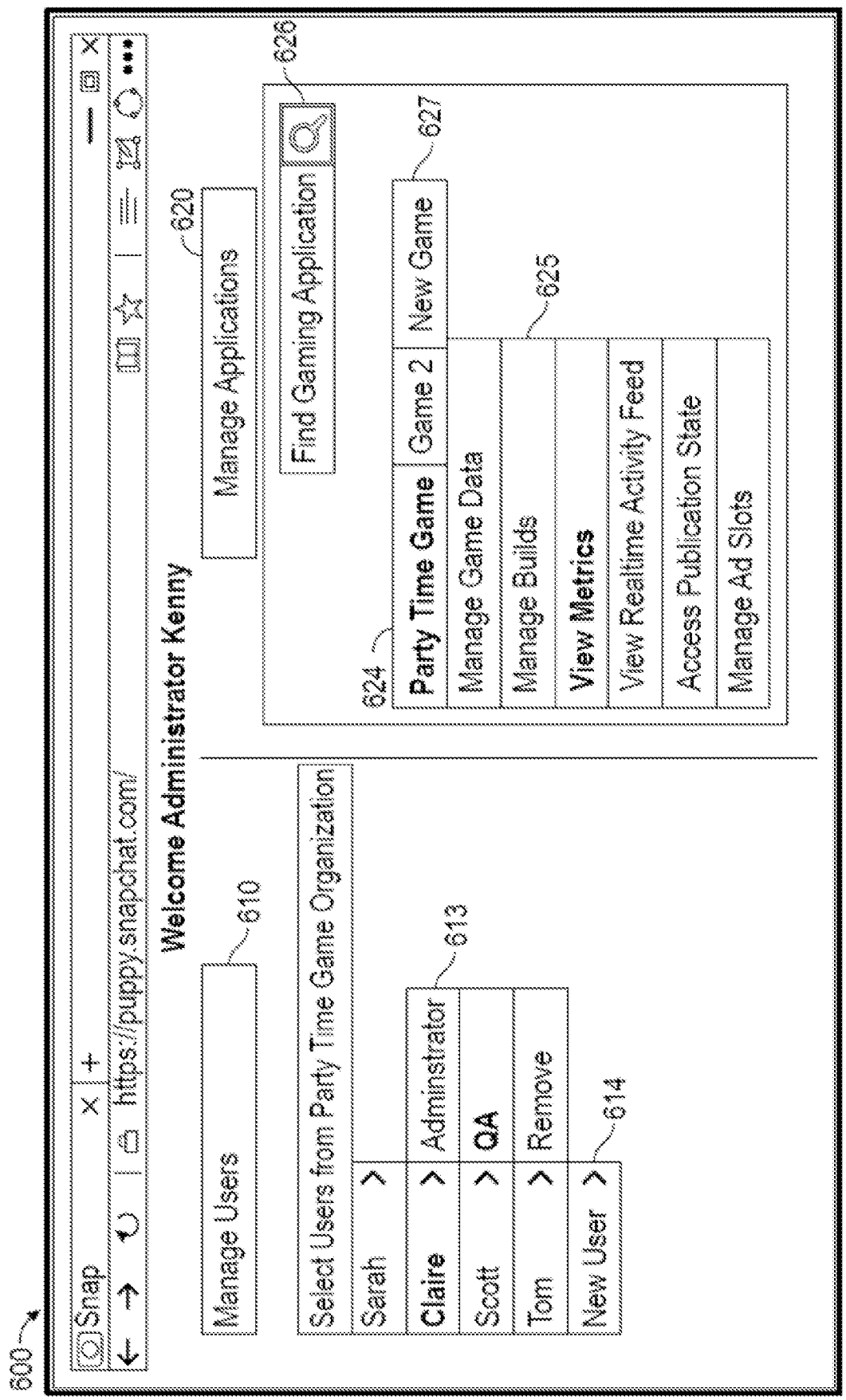
FIGS. 6-7 are illustrative user interfaces of the gaming application testing platform, according to example embodiments.

After the member successfully creates a new account or logs in using the existing messaging application credentials, the member may be presented with a web interface (e.g., similar to the interface shown in FIG. 6). The web interface may enable the member to manage access to the gaming application of other members of the gaming application developer entity and manage one or more gaming applications submitted to the gaming application testing platform for testing (e.g., integration into the messaging application emulator 105) or for production (e.g., integration into the messaging application). For example, as shown in web interface 600 (FIG. 6), an administrator is presented with a screen that includes a manage users region 610 and a manage applications region 620. This web interface 600 may be presented by the gaming application testing platform to an administrator after the gaming application testing platform receives login information from the administrator.

At operation 402, the gaming application testing platform of the gaming application platform 124 receives a request from the first user to create a gaming application. For example, the manage applications region 620 of interface 600 includes a list of gaming applications submitted to the gaming application testing platform by the gaming application developer entity. Through manage applications regions 620, a user can add or view the status of various gaming applications. For example, the gaming application testing platform may receive a user selection of a new game option 627. In response to receiving the selection of the new game option 627, the gaming application testing platform may allow the administrator to add game information associated with a new game. For example, the gaming application testing platform may present a screen that allows the user to input a game title (e.g., the brand of a game and how it will be known), a game description (e.g., a short explanatory summary of the game), and any URL or website associated with the game.

After the new game is submitted, the user can access various options associated with the new game. For example, the gaming application testing platform may receive a user selection of a first game 624 (e.g., "Party Time Game") that was previously created. In response to receiving the selection of the first game 624, the gaming application testing platform may present a list of options 625 associated with the selected game. The options 625 may include a manage game data option, a manage builds option, a view metrics option, a view realtime activity feed option, an access publication state option, a hide option (not shown), and a manage advertisement slots option.

In response to receiving a user selection of the manage game data option, the gaming application testing platform may present to the user the previously submitted game data (e.g., the title, description, and any URL or website associated with the game). The user can modify this information and store the updated information associated with the selected game.

In response to receiving a user selection of the manage builds option, the gaming application testing platform may present the user with an interface for submitting one or more builds of the gaming application to the gaming application testing platform. A build contains the actual file that is used to serve the gaming application. Several builds may be created for the same game in order to test different scenarios and functions of a game. Each of the builds associated with the same game can be launched independently in parallel on multiple devices 102 using respective messaging application emulators 105. To submit a build to the gaming application testing platform, the user may be requested to provide a version number, release notes, a file including the code for the gaming application (e.g., an HTML5 file), a preview video for the game (which may be made available in a discover screen, a game preview screen, and other places of the messaging application after the game is in production and made publicly available), a game overlay image (e.g., an image used as an overlay on the preview video in the discover screen alongside the Play With (friend selection) component), and a game icon (e.g., box art representing the gaming application). In some embodiments, only some of the information submitted with the build may be subsequently modified by an administrator (e.g., the release notes). Once a gaming application is sent to production and made publicly available to all users of the messaging client application 104, some or all of the information submitted as part of the build is made available. For example, the game icon submitted with the build may be used to represent the game in a game drawer interface for a given participant in a conversation of the messaging client application 104 to launch the gaming application by retrieving and accessing the file that contains the code for the game.

In response to receiving a user selection of the view metrics option, the gaming application testing platform may retrieve metrics associated with the gaming application (e.g., the Party Time Game game) and each of the builds of the gaming application. For example, the metrics associated with the gaming application may indicate to the user the average time per session, the total sessions, the crash rate per platform, and the average loading time of the game. The metrics associated with each build of the gaming application may indicate to the user the average time per session, the total sessions, the crash rate per platform and the average loading time of the game. Specifically, the gaming application level metrics represent metrics across all of the builds (e.g., by computing an average of each metric that is represented for each build) and the build level metrics represent the metric for that build specifically. This allows the gaming application developer to analyze how the game is performing on the application level as a whole and on the individual build level to determine which builds are the best performing or have the most interest and fewest issues.

In response to receiving a user selection of the access publication state option, the gaming application testing platform may present to the user the current publication state of the gaming application. The gaming application testing platform may present the user with options to change the publication state of the gaming application. For example, the gaming application testing platform may indicate whether a given build is under review, approved, live (e.g., in production), or in staging. Specifically, after a build is submitted to the gaming application testing platform, the messaging application (by way of an operator or reviewer) may analyze the build to determine whether it meets the standard requirements of the messaging application. In this phase, the gaming application testing platform may indicate that the build is under review. After the messaging application approves the build, the build can proceed to staging or production. During staging, the build is made available for launching by the authorized members of the gaming application developer user the messaging application emulator 105. Specifically, the messaging application emulator 105 may add the build to a list of builds available to be launched to a given user to allow the user to test and play the gaming application. In certain embodiments, a build may be placed in a staging state after being submitted to the gaming application testing platform without being reviewed by the messaging application operator. During the live state, the build is made available for public distribution to users of the messaging client application 104 (e.g., users external to the gaming application developer entity). By way of the access publication state option, a user can change the state of a given build from being in a staging state to a production state or can request to publish or unpublish a given build to submit or remove the build from staging.

In response to receiving a user selection of a hide option (not shown), the gaming application testing platform prevents a given build or gaming application from being shown and available for selection in the messaging application emulator 105 of the gaming application testing platform. In this way, no user can launch the gaming application of a build that has been hidden. In certain embodiments, the hide option is only made available for selection in response to the gaming application testing platform determining that no member of the gaming application developer entity is currently accessing the gaming application using the messaging application emulator 105. If a given member is currently playing the gaming application and testing the gaming application using the messaging application emulator 105, the hide option cannot be selected until that user finishes their session. After the hide option is selected, the hide option may be converted to an unhide option. Selection of the unhide option reverses the operation of the hide option and returns the build of the application to the active state to enable users to launch the gaming application from the messaging application emulator 105.

In response to receiving a user selection of the manage advertisement slots option, the gaming application testing platform enables the user to insert one or more advertisement slots into the gaming application. Each advertisement slot may be associated with a reward video that is presented to allow a user to advance a level or receive a free upgrade in the game for watching an advertisement. Once the reward video or advertisement is consumed to completion by the player in the gaming application, the player is rewarded with advancing the level or receiving the free upgrade. In response to accessing the advertisement slot interface by way of the advertisement slot option, the user can specify an identifier of an advertisement slot that the gaming application, reward video system 125, and the gaming application platform 124 are provided. In certain embodiments, the user can specify a geographic region associated with the advertisement slot to cause the reward video system 125 to select an advertisement to serve that is associated with the specified geographic region. After selecting the advertisement slot and providing the identifier for the advertisement, the user can select a submit option to cause the selected advertisement slot to be reviewed before it is published with the gaming application. After or before submitting the advertisement slot for approval, the user can associate the advertisement slot with one or more builds or portions of those builds of the gaming application.

In certain embodiments, to create an advertisement slot, the gaming application testing platform may request that the user provide an advertisement slot title (e.g., a way for the advertisement slot to be recognized by the gaming application, reward video system 125, and the gaming application platform 124), an advertisement slot description (e.g., a summary of the advertisement slot that describes what the reward is for viewing the advertisement), a slot identifier, countries (e.g., a list of countries to offer an advertisement slot), and a video replay. In certain embodiments, in response to receiving a user selection of the advertisement slots option, the gaming application testing platform presents a list of all the advertisement slots previously created by the user and allows the user to view the status of each advertisement slot (e.g., whether the advertisement slot has been approved for publication). In certain embodiments, the user can make changes to the advertisement slots listed by the gaming application testing platform (e.g., a user can change the advertisement slot title, description, slot identifier, and countries). In certain embodiments, after an advertisement slot becomes active after being approved for publication, only certain fields of the advertisement slot can be modified (e.g., the title and description can be modified but not the slot identifier and countries). In certain embodiments, the gaming application testing platform presents an option to delete or disable an advertisement slot or unpublish a given advertisement slot that has been requested to be published. If the user deletes or disables the advertisement slot, the build or game associated with the advertisement slot will no longer present an option to watch the advertisement to receive a reward.

In response to receiving a user selection of the view realtime activity feed option, the gaming application testing platform may present an indication of actions performed by any user of the gaming application on the messaging application emulator 105 or modifications to the gaming application on the website associated with the gaming application testing platform. This allows an administrator or user in a QA role to receive up-to-date changes associated with one or more gaming applications. The indication may identify the user who performed the action or activity, the timestamp of the activity, and any other relevant information. For example, the realtime activity feed may specify whether: new applications were created, modified, hidden, or deleted; a build was created, submitted, approved, rejected, published, unpublished, or modified; an inventory was created, submitted, approved, rejected, published, unpublished, is live, or modified; and an advertisement slot was created, modified, published, unpublished, went live, or was deleted. Certain realtime activities may be sent as notifications to administrators and users who have a QA role. In some embodiments, administrators may receive a different set of notifications than users who have a QA role depending on the type of change associated with the notification. Table 1 below summarizes the types of actions and which role receives the notification:

TABLE 1

Notification transmission
("Yes" indicates user receives notification,
"No" indicates user does not receive notification)

| Action | Administrator | QA Role |
|---|---|---|
| User added, removed, role updated | Yes | No |
| Application created | Yes | No |
| Build created, submitted, approved, rejected, published, unpublished, went live | Yes | Yes |
| Inventory | Yes | No |
| Advertisement slot created, submitted, approved, rejected, published, unpublished, went live | Yes | No |

Referring back to FIG. 4, at operation 403, the gaming application testing platform of the gaming application platform 124 receives a request from the first user to authorize a second user of the plurality of users to access the gaming application. For example, the administrator may specify other members of the gaming application developer that should have administrative or limited access (e.g., QA roles) to the web interface of the gaming application testing platform or the messaging application emulator 105.

In certain embodiments, a member designated as an administrator may have all the rights and privileges as the current administrator selected by the gaming application developer entity. Namely, administrators can add, remove, and update access rights of other members of the gaming application developer entity and can manage gaming applications submitted to the gaming application testing platform. A member designed with limited access (e.g., a QA role) may only have read access to the web interface of the gaming application testing platform and is eligible to launch various builds of the games provided to the gaming application testing platform using the messaging application emulator 105.

The manage users region 610 of interface 600 includes a list of members of the gaming application developer entity that have been provided with access to the gaming application testing platform. In some embodiments, members listed in the manage users region 610 may be visually distinguished based on their assigned roles (e.g., administrators may be displayed in one color and QA roles may be displayed in another color). The administrator may select different users displayed in the manage users region 610 to change their roles or remove the users.

For example, in response to receiving a user selection of user "Claire", the gaming application testing platform may present a list of options 613 that include an administrator option, a QA option, and a remove option. In response to receiving a user selection of the administrator option, the user "Claire" may be assigned the role of administrator. In response to receiving a user selection of the QA option, the user "Claire" may be assigned the limited access QA role. In response to receiving a user selection of the remove option, the user "Claire" may be removed from the gaming application testing platform. In such circumstances, the access privileges of this user may be deleted so that the user can no longer access any portion of the gaming application testing platform.

In response to receiving a user selection of the new user option 614, the user may be provided with an interface to add another member of the gaming application developer entity. Once added, the newly added member may be provided with access rights to the gaming application testing platform. Specifically, in response to receiving a user selection of the new user option 614, the gaming application testing platform may request the email address and access level (e.g., administrator or QA role) associated with the newly added user. The interface 600 may explain to the user the difference in access rights between the two roles. After the gaming application testing platform receives the contact information for the newly added member, the gaming application testing platform may send an email to the newly added member. In certain embodiments, the email may request that the newly added member confirm their membership in the gaming application developer entity. In particular, the email may ask the newly added member whether they work at the gaming application developer entity.

To confirm their membership, the newly added member may select a link in the email to log into the website associated with the gaming application testing platform. The newly added member may log into the website using their credentials from the messaging application and/or may create a new account (as discussed above for the administrator). After the newly added member logs into the website of the gaming application testing platform, the newly added member may be redirected to webpage that prompts the member to download the messaging application emulator 105. The newly added member may download and install the messaging application emulator 105 to their client device 102 from the webpage.

Referring back to FIG. 4, at operation 404, the gaming application testing platform of the gaming application platform 124 presents to the second user the gaming application integrated with features of the messaging application. For example, after the messaging application emulator 105 is downloaded, the newly added member can launch the emulator 105 to access and launch various builds of the gaming application within a simulated environment of the messaging client application 104.

Figure 7:
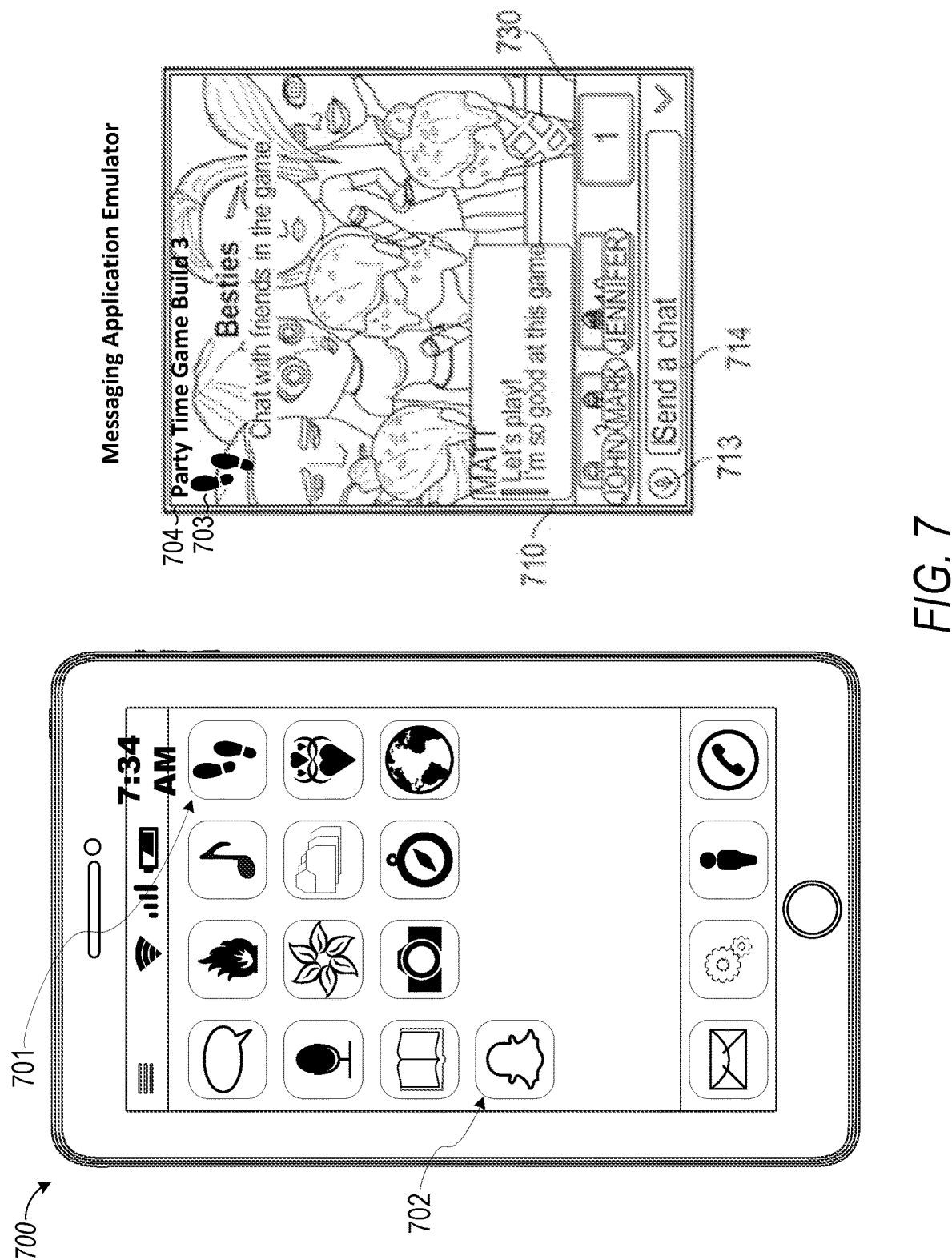

For example, as shown in FIG. 7, a given user of a device 102 may access a list of applications represented as different icons on a display 700. The device 102 may include a first icon 702 associated with launching the messaging client application 104 and a second icon 701 associated with launching the messaging application emulator 105. In response to receiving the user selection of the first icon 702, the messaging client application 104 is launched by the device 102 and the user can access a conversation interface of the messaging client application 104. From within the conversation interface, the user can communicate with the user's friends and launch various gaming applications that have been approved for production by the gaming application testing platform. In response to receiving a user selection of the second icon 701, the messaging application emulator 105 is launched by the device 102. The messaging application emulator 105 may communicate with the gaming application testing platform to obtain a list of available gaming applications and builds of each gaming application of the gaming application developer entity of which the user is a member. The user may select to launch a given build (e.g., build 3) of the gaming application (e.g., Party Time Game). In response, the messaging application emulator 105 may present an interface of the selected build of the gaming application with a conversation interface having the same look and feel as the conversation interface of the messaging client application 104. The interface may include an icon 703 representing the messaging application emulator 105 so the user knows that the user is using the emulator 105 and not the messaging client application 104 itself. The interface may also include the title and build number 704 of the gaming application the user launched.

Specifically, the interface may allow the user to communicate with other members of the gaming application developer entity who have been authorized to play and access the build of the gaming application. For example, the interface may present a conversation region that identifies each authorized member (e.g., using avatars from the messaging client application 104 of each authorized member) and that allows the user to type a textual message using text region 714, or communicate by voice (e.g., using a voice party line feature of the messaging client application 104) by selecting the voice option 713. Messages received from other authorized members of the gaming application developer entity while playing the gaming application are presented by the emulator 105 using chat bubble 710 that has the same look and feel as the chat bubbles presented by the respective messaging client applications 104. Various other features and functions of the messaging client application 104 that are provided by the emulator 105 and integrated into the gaming application are discussed in more detail in commonly-owned, commonly-assigned Alexander R. Osborne et al., U.S. patent application Ser. No. 16/177,332, filed Oct. 31, 2018, entitled "IN-GAME STATUS BAR," which is hereby incorporated by reference and commonly-owned, commonly-assigned Alexander R. Osborne et al., U.S. patent application Ser. No. 16/177,318, filed Oct. 31, 2018, entitled "GAMES IN CHAT," which is hereby incorporated by reference.

Providing a first user of a plurality of users with access to a gaming application testing platform, each of the plurality of users being associated with a common gaming application developer entity, the gaming application testing platform being associated with a messaging client application; receiving, with the gaming application testing platform, a request from the first user to create a gaming application; receiving, with the gaming application testing platform, a request from the first user to authorize a second user of the plurality of users to access the gaming application; and presenting to the second user, with the gaming application testing platform, the gaming application integrated with features of the messaging client application significantly improves how a game developer tests and creates games and reduces the number of steps the game developer has to perform to create, debug, and launch a gaming application. This is because the game developer is provided with a platform that not only allows the game developer to launch the game in a simulated messaging application environment to see how the game behaves and operates, but the platform also provides metrics identifying how the game and various builds of the game operate in the simulated environment. Rather than iteratively launching a game in a mobile phone browser and using the limited interface of the phone browser to guess how the game would behave under different conditions and with different applications as done conventionally, only a few steps may be needed by the game developer to test the game behavior under simulated messaging application conditions.

Referring to FIG. 5, at operation 501, the gaming application testing platform of the gaming application platform 124 receives a user input. In response to determining that the user input corresponds to adding a user, the process 500 proceeds to operation 502. In response to determining that the user input corresponds to adding a gaming application, the process 500 proceeds to operation 506. In response to determining that the user input corresponds to adding an advertisement slot, the process 500 proceeds to operation 510. In response to determining that the user input corresponds to publication, the process 500 proceeds to operation 512. For example, the gaming application testing platform may detect and receive user input from a user who is browsing a webpage interface 600 (FIG. 6) of the gaming application testing platform.

At operation 502, the gaming application testing platform of the gaming application platform 124 receives contact information for a new user. For example, in response to receiving a user selection of option 614, the gaming application testing platform presents a user with an interface for inputting contact information for a new member of the gaming application developer entity to invite to access the gaming application.

At operation 503, the gaming application testing platform of the gaming application platform 124 assigns access restrictions to the new user. For example, the gaming application testing platform may present options 613 that allow a user to specify whether a given user is an administrator or has a QA role. Also, the gaming application testing platform may allow the user to specify the role of the new user through the contact information interface that is provided to invite the new user.

At operation 504, the gaming application testing platform of the gaming application platform 124 invites the new user and provides an option to download a messaging application emulator 105 to the new user. For example, the gaming application testing platform sends an email to the new user to confirm the new user is a member of the gaming application developer entity. In response to the user selecting a link, a webpage may be presented to the user to confirm their membership in the gaming application developer entity and requesting that the user download the emulator 105 to their device 102.

At operation 505, the gaming application testing platform of the gaming application platform 124 allows the user to update access restrictions for other users. For example, option 613 may allow a user to select a given authorized member and change or assign roles to the selected member.

At operation 506, the gaming application testing platform of the gaming application platform 124 receives game data including title and description for a new gaming application. For example, the gaming application testing platform may present a new game option 627. In response to receiving a user selection of the new game option 627, an interface may be presented to the user to input the game title and description of the new game.

At operation 507, the gaming application testing platform of the gaming application platform 124 receives a plurality of builds of the new gaming application. For example, in response to receiving a user selection of the manage builds option from the list of options 625, the gaming application testing platform presents the user with an interface for adding gaming application build information including a file of the gaming application used to launch the gaming application build.

At operation 508, the gaming application testing platform of the gaming application platform 124 presents builds to users associated with the game developer entity. For example, in response to receiving a user selection of the second icon 701, the gaming application testing platform launches the emulator 105 and presents a list of builds the user of the device 102 is authorized to launch.

At operation 509, the gaming application testing platform of the gaming application platform 124 provides access to gaming application and build metrics. For example, in response to receiving a user selection of the view metrics option from the list of options 625, the gaming application testing platform retrieves metrics for the gaming application and each build of the gaming application and presents the metrics to the user.

At operation 510, the gaming application testing platform of the gaming application platform 124 receives advertisement slot selection data. For example, in response to receiving a user selection of the manage advertisement slots option from the list of options 625, the gaming application testing platform allows a user to add an advertisement slot and manage previously submitted advertisement slots and view their current status.

At operation 511, the gaming application testing platform of the gaming application platform 124 associates the advertisement slot with one or more builds of the game.

At operation 512, the gaming application testing platform of the gaming application platform 124 determines the type of publication associated with the user input. In response to determining the type of publication is a staging request, the process 500 proceeds to operation 513. In response to determining the type of publication is a production request, the process 500 proceeds to operation 514.

At operation 513, the gaming application testing platform of the gaming application platform 124 provides access to the gaming application to limited members of the game developer entity selected by the user. For example, various builds of the gaming application are made available to be launched by authorized members of the gaming application developer entity using the emulator 105.

At operation 514, the gaming application testing platform of the gaming application platform 124 provides access to the gaming application to all users of the messaging client application 104. For example, an approved build is integrated into the messaging client application 104 to make the gaming application available to be launched by any user of the messaging client application 104 through a conversation interface of the messaging client application 104.

Figure 8:
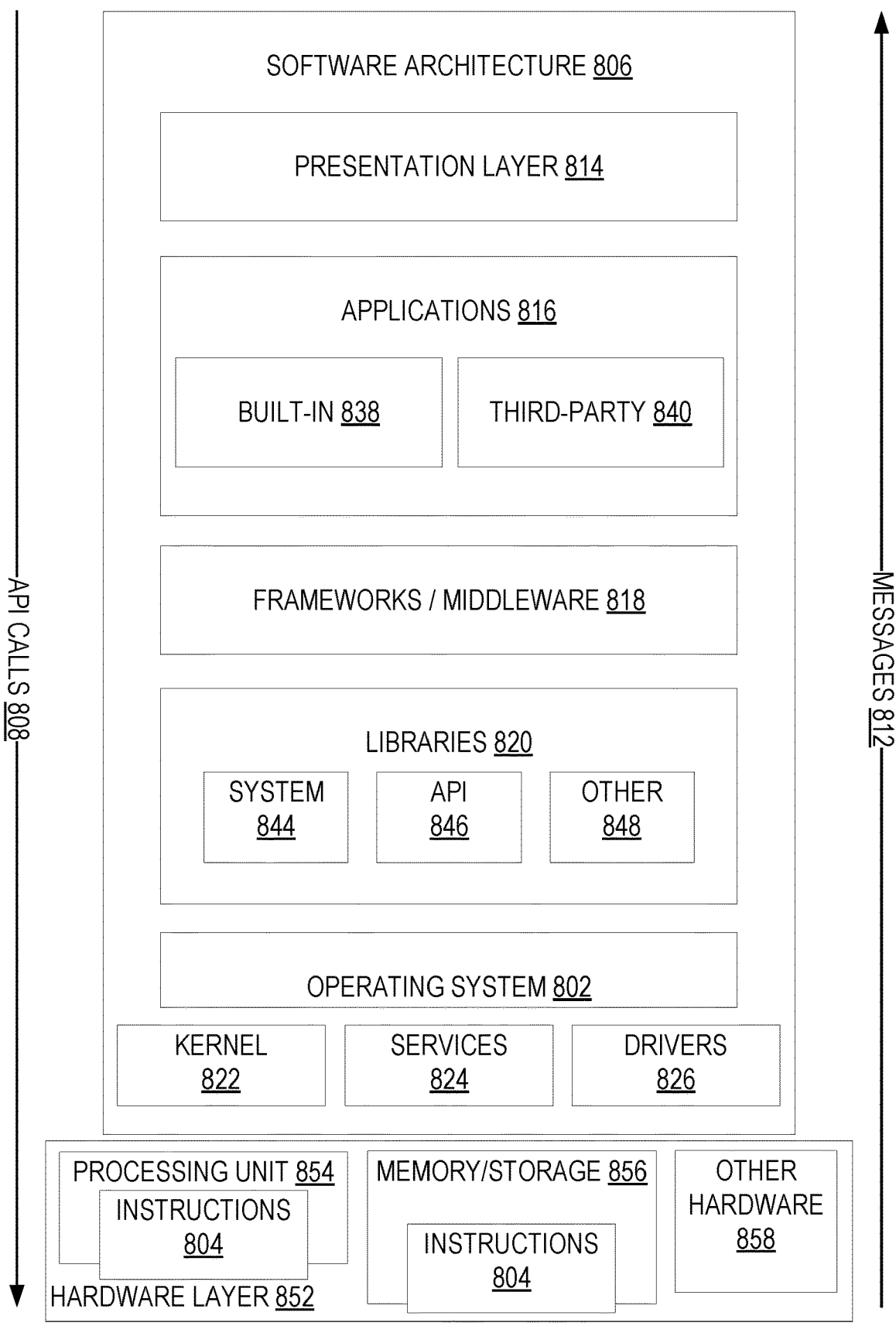
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 800 of FIG. 8 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic UI (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
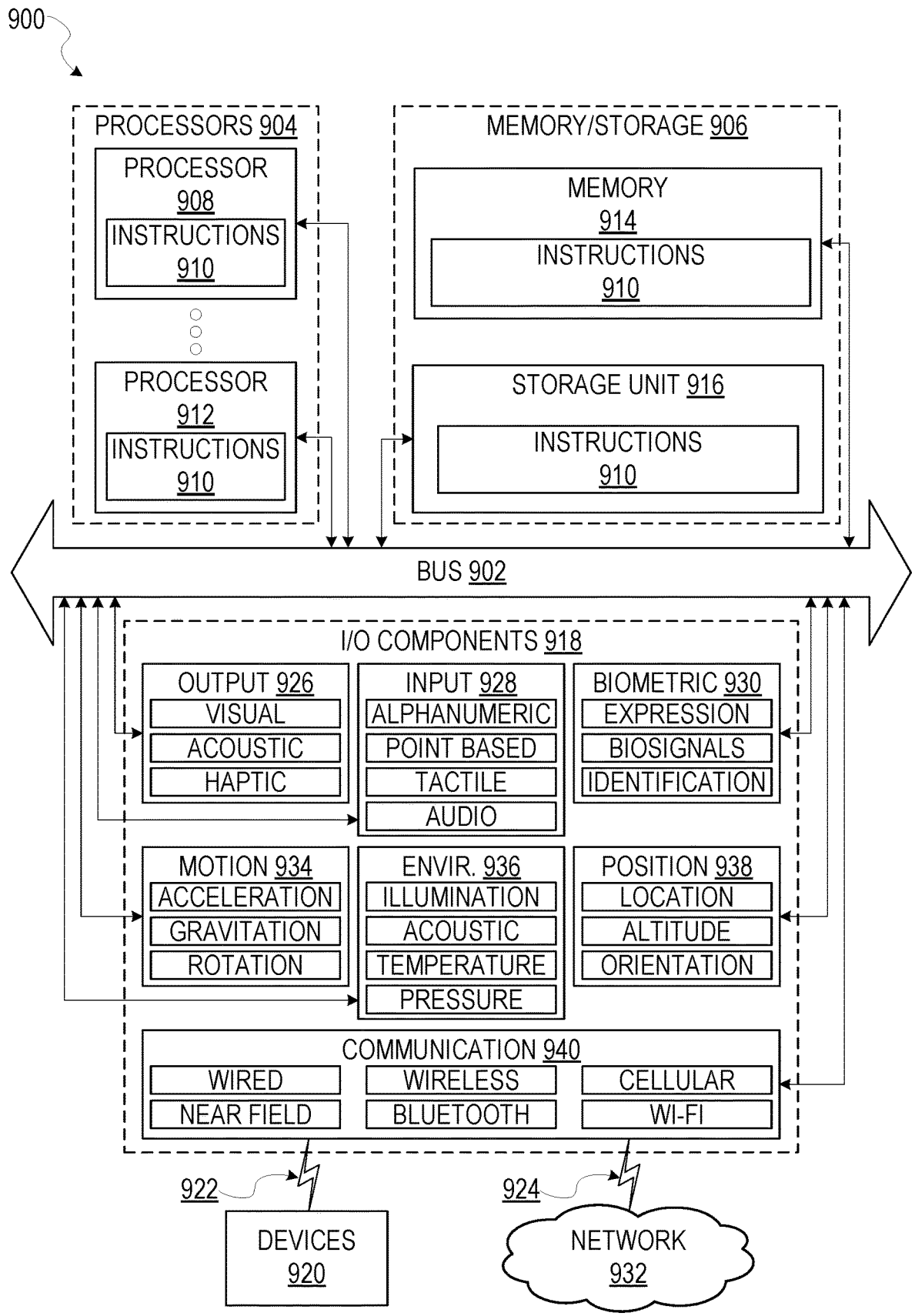
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, by a gaming application testing platform, a request to create a gaming application from a first user of a plurality of users, the request from the first user comprising a build file of the gaming application;
   presenting to a second user of the plurality of users, by the gaming application testing platform, the gaming application integrated with features of a messaging application; and
   presenting to the first user, by the gaming application testing platform, a first set of metrics across a plurality of builds of the gaming application and a second set of metrics on a particular build of the gaming application associated with the build file.

2. The method of claim 1 further comprising:
providing the first user with access to the gaming application testing platform, each of the plurality of users being associated with a common gaming application developer entity, the gaming application testing platform being associated with the messaging application; and
in response to receiving a request from the first user to place the gaming application into production, providing access to the gaming application to users external to the common gaming application developer entity.

3. The method of claim 1, wherein the request is received via a website that hosts the gaming application testing platform, wherein the first set of metrics are generated by the gaming application testing platform on an application level of the gaming application and a build level of the gaming application, the application level representing metrics across the plurality of builds, and wherein the first user has administrative access rights to the gaming application and the second user has read-only rights to the gaming application.

4. The method of claim 1, wherein the gaming application testing platform comprises a website interface and a messaging application emulator, wherein the gaming application, integrated with features of the messaging application, is presented to the second user via the messaging application emulator, wherein the messaging application emulator is an application that is different from the messaging application and enables the second user to access the gaming application through a look and feel of the messaging application.

5. The method of claim 4, wherein the messaging application emulator comprises features relating to a conversation of the messaging application, and wherein the second user is limited to communicating through the messaging application emulator with the plurality of users.

6. The method of claim 1, wherein receiving the request from the first user to create the gaming application comprises:
receiving data describing the gaming application; and
receiving one or more builds of the gaming application, each of the one or more builds including executable code for launching the gaming application via the messaging application.

7. The method of claim 1, wherein presenting the gaming application integrated with features of the messaging application comprises presenting a plurality of representations of the gaming application to the second user, each of the plurality of representations corresponding to a different build of the gaming application, each of the builds including executable code for launching the gaming application via the messaging application.

8. The method of claim 1, further comprising receiving, by the gaming application testing platform, a request from the first user to authorize the second user to access the gaming application.

9. The method of claim 8, wherein the request from the first user to authorize the second user comprises a level of access associated with the second user, further comprising sending, with the gaming application testing platform, an invitation to the second user to log into the gaming application testing platform and download a messaging application emulator of the gaming application testing platform.

10. The method of claim 1 further comprising presenting to the plurality of users, with the gaming application testing platform, a notification of an activity performed by the second user while accessing the gaming application, the notification including an identifier of the second user, the activity performed, and a timestamp of the activity.

11. The method of claim 1 further comprising receiving, with the gaming application testing platform, a request from the first user to assign an advertisement slot in the gaming application, the advertisement slot being associated with a reward video presented during gameplay of the gaming application.

12. The method of claim 1 further comprising notifying the second user about availability of a new build associated with the gaming application in response to receiving a new build from the first user.

13. The method of claim 1, wherein the gaming application integrated with features of the messaging application is presented to the second user in response to receiving a request from the first user to publish the gaming application.

14. A system comprising:
a processor configured to perform operations comprising:
receiving, by a gaming application testing platform, a request to create a gaming application from a first user of a plurality of users, the request from the first user comprising a build file of the gaming application;
presenting to a second user of the plurality of users, by the gaming application testing platform, the gaming application integrated with features of a messaging application; and
presenting to the first user, by the gaming application testing platform, a first set of metrics across a plurality of builds of the gaming application and a second set of metrics on a particular build of the gaming application associated with the build file.

15. The system of claim 14, wherein the operations further comprise in response to receiving a request from the first user to place the gaming application into production, providing access to the gaming application to users external to a common gaming application developer entity.

16. The system of claim 14, wherein the first user has administrative access rights to the gaming application and the second user has read-only rights to the gaming application.

17. The system of claim 14, wherein the gaming application testing platform comprises a website interface and a messaging application emulator, wherein the gaming application, integrated with features of the messaging application, is presented to the second user via the messaging application emulator, wherein the messaging application emulator is an application that is different from the messaging application and enables the second user to access the gaming application through a look and feel of the messaging application.

18. A non-transitory machine-readable storage medium that includes instructions that, when executed by one or more processors of a machine, cause the machine to perform operations comprising:
receiving, by a gaming application testing platform, a request to create a gaming application from a first user of a plurality of users, the request from the first user comprising a build file of the gaming application;
presenting to a second user of the plurality of users, by the gaming application testing platform, the gaming application integrated with features of a messaging application; and
presenting to the first user, by the gaming application testing platform, a first set of metrics across a plurality of builds of the gaming application and a second set of metrics on a particular build of the gaming application associated with the build file.

19. The non-transitory machine-readable storage medium of claim 18, wherein the operations further comprise receiving, with the gaming application testing platform, a request from the first user to assign an advertisement slot in the gaming application, the advertisement slot being associated with a reward video presented during gameplay of the gaming application.

20. The non-transitory machine-readable storage medium of claim 18, wherein the first set of metrics include average time per session, total sessions, crash rate per platform, and average loading time.

\* \* \* \* \*